May 1, 1951 C. E. TACK ET AL 2,550,732
BRAKE ARRANGEMENT AND SLACK ADJUSTER THEREFOR
Filed Aug. 23, 1946
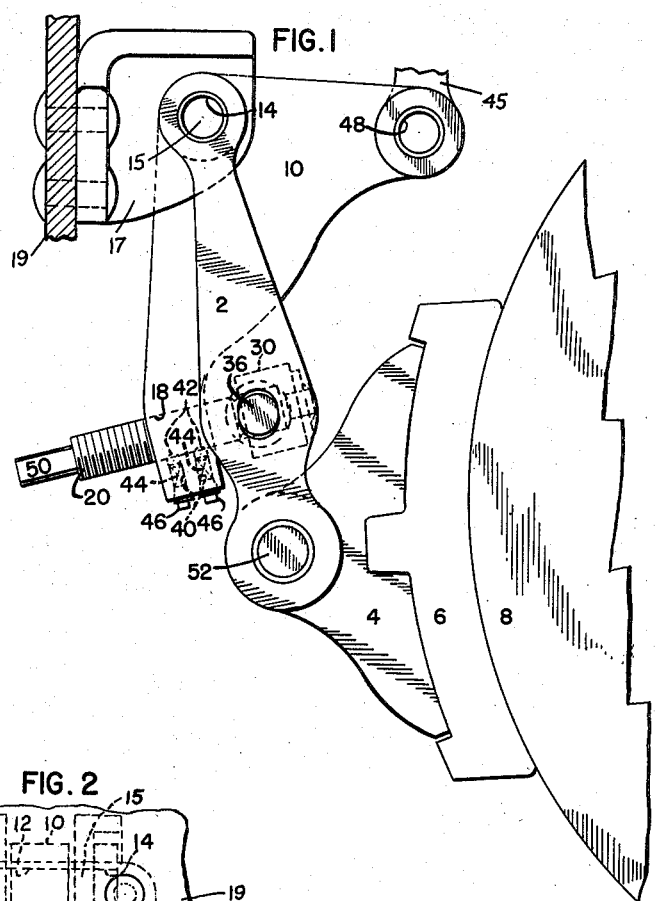
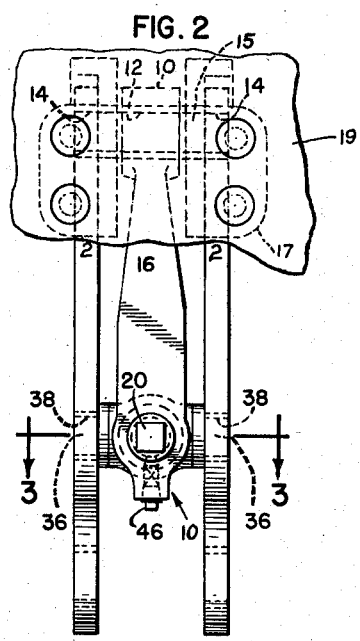
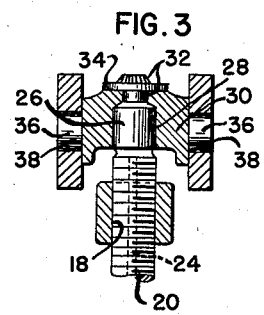
INVENTORS
CARL E. TACK
FRED E. BACHMAN
BY
ATTORNEY Patented May 1, 1951

2,550,732

UNITED STATES PATENT OFFICE 2,550,732

BRAKE ARRANGEMENT AND SLACK ADJUSTER THEREFOR

Carl E. Tack and Fred E. Bachman, Chicago, Ill., assignors to American Steel Foundries, Chicago, Ill., a corporation of New Jersey Application August 23, 1946, Serial No. 692,515

11 Claims. (Cl. 188—197)

Our invention relates to railway brake equipment and more particularly to a novel slack adjuster therefor.

An object of our invention is to provide in a brake arrangement a novel slack adjuster which may be manually adjusted for varying the slack in the brake rigging associated therewith by adjusting the relative position of certain brake levers in which the slack adjuster may be mounted.

Another object of our invention is to provide a brake slack adjuster which may be used in a rigging of the beamless type in which truck levers are located in the plane of the brake shoes and wheels.

A further object of our invention is to devise a slack adjuster that consists of a minimum of parts, is easily assembled and disassembled, is of simple rugged construction and which is efficient in use and accomplishes the purposes for which it is intended under various operating conditions.

Our invention comprehends a slack adjuster which may be mounted in the lower end of a brake lever pivoted on the truck frame and may comprise a manually operated screw mechanism threaded into said lever and operatively connected to associated hangers for adjusting the slack conditions in the brake rigging by adjusting the lever with respect to said hangers and simultaneously modifying the position of said lever where it is connected to associated brake rigging.

These and other objects of our invention will be apparent from a consideration of the specification and the drawings, wherein:

Figure 1 is a side elevation of a brake structure embodying our invention;

Figure 2 is an end elevation viewed from the left as seen in Figure 1 and showing the hangers and lever as pivoted to a bracket mounted on the truck frame fragmentarily shown, the truck frame and support bracket being shown in phantom lines; and Figure 3 is a fragmentary sectional view taken substantially in the plane as indicated by line 3—3 of Figure 2.

Describing our invention in detail, the spaced parallel hangers or hanger levers 2, 2 are at their respective lower ends pin-connected to the brake head 4 carrying the shoe 6 for braking engagement with the periphery of the wheel 8.

Positioned between the hangers 2, 2 is an elbow or bell-crank brake lever 10 having a bushed opening 12 intermediate its ends at its elbow aligned with bushed openings 14, 14 formed at the upper ends of said hangers 2, 2 by means of which the hangers and lever are pivoted on a pin or pivot member 15, the pin extending through the ears of a bracket 17, said bracket being mounted on a truck frame 19.

The lever 10 has adjacent the lower end thereof the thickened portion 16 in which is formed the threaded approximately horizontal opening 18 for reception of the threaded bolt or adjusting screw 20 extending through the opening and beyond the opposite edges thereof. Interrupting the surface of the bolt is a longitudinal slot 24 provided for a purpose hereinafter described. The inner end 26 (Figure 3) of the bolt 18 is cylindrical in form and is fitted into an opening 28 of complementary form in the trunnion block 30. It may be noted that the innermost end of the bolt is of reduced diameter and protrudes outside the block as at 32 (Figure 3) on which is mounted a washer 34. The end 32 may then be flattened or otherwise secured to the washer so that the bolt is not removable from the block although rotatable therein.

The trunnion or fulcrum block 30 is positioned between the hangers 2, 2 and has the outwardly extending round lugs 36, 36 (Figure 3) at opposite sides thereof fitted into the aligned openings 38, 38 provided in said hangers 2, 2 intermediate their ends, as illustrated in Figure 2.

In the lower end of the lever 10 are formed parallel vertical openings 40, 40 extending from the bottom edge of the lever to the before-mentioned horizontal opening 18. Within each opening 40 is positioned a bearing 42 seated upon a spring 44, diagrammatically illustrated in Figure 1. Into the flaring open end of each opening 40 is threaded a plug 46 compressing the spring 44 which urges the bearing 42 into the slot 24 in the bolt 18. By means of this arrangement the bolt 18 is yieldably held in a selected adjusted position.

In the other leg of the lever 10 is formed a bushed opening 48 by means of which the lever is pivotally pin-connected to associated actuating means or brake rigging 45 fragmentarily shown in Figure 1.

From this arrangement it will be appreciated that by turning the bolt 20 by application of a wrench to the outer hexagonal or otherwise non-round end 50 thereof, the lever 10 may be moved in one direction or the other for adjusting its position, thereby varying the slack, the adjustment varying the position of the brake head and shoe assembly with respect to the associated wheel, as will be clearly apparent from a consideration of Figure 1.

In assembling our novel invention, the bolt 20 is threaded into the opening 18 in the lever 10, the trunnion block 30 is sleeved over the inner end of the bolt 20, and the washer 34 is sleeved onto the end of the bolt projecting beyond the inner edge of the trunnion block and this end is secured to the washer by any conventional means. A bearing 42 is placed into each opening 40 followed by a spring 44. The plugs 46, 46 are then threaded into the open ends of the openings 40, 40. The levers 2, 2 are then aligned and the lugs 36, 36 are fitted into the openings 38, 38 of the hangers 2, 2. The brake head is then pivoted between the lower ends of the hangers 2, 2 as at 52. The hangers 2, 2 and the lever 10 are then hung on the truck frame by means of the pin 15 which extends through the openings 14, 14 and 12, respectively, and, through the ears of bracket 17. Finally, the lever 10 is pivotally connected to the actuating means or brake rigging 45 through the opening 48.

It may be noted that we have illustrated our invention in connection with a pair of spaced hangers but it may easily be used in connection with a single bifurcated hanger as will be apparent to those skilled in the art.

It is to be understood that we do not wish to be limited by the exact embodiment of the device shown which is merely by way of illustration and not limitation as various and other forms of the device will, of course, be apparent to those skilled in the art without departing from the spirit of the invention or the scope of the claims.

We claim:

1. In a brake arrangement, a truck frame, a pair of hangers carrying a brake head and shoe assembly therebetween, a lever between said hangers pivoted intermediate its ends with the upper ends of said hangers from said frame and having a connection with associated brake rigging at one end, and an adjustable connection between the other end of said lever and said hangers comprising an adjusting screw threaded into said lever at said other end thereof, a trunnion block pivoted to said hangers intermediate the ends thereof, a rotatable connection between said screw and block, and means for holding said screw in a selected adjusted position.

2. In a brake arrangement for a railway car truck, a truck frame, a hanger carrying friction means at one end, a lever pivoted intermediate its ends with the other end of said hanger to said frame, said lever having an adjustable connection with said hanger at one end, and brake rigging connected to the other end of said lever, said adjustable connection comprising an adjusting screw threaded into said lever, and means rotatably and pivotally connecting said screw to said hanger intermediate the ends thereof.

3. A brake arrangement comprising a hanger member and a brake lever member pivotally connected at a common point, a brake shoe assembly connected to the hanger at another point, a fulcrum block pivoted to one of the members intermediate said points, an adjuster screw in threaded engagement with the other member and rotatably connected to the block, and means on said lever member at a point spaced from both of said first and second-mentioned points for connection to associated actuating means.

4. In a railway brake rigging comprising a pair of spaced hangers pivotally supported at their upper ends from an associated support structure on a common pivot, a wheel-engaging friction assembly between said hangers connected to the lower ends thereof, an elbow lever pivoted at one point on said common pivot, associated brake rigging connected to said lever at another point, and an adjustable connection between said lever and hangers comprising an adjusting screw in threaded engagement with said lever at a point other than said first and second-mentioned points, and a means pivoted to said hangers intermediate the ends thereof and having a rotatable connection with said screw.

5. In a brake arrangement, a hanger member pivoted at one end to an associated support structure and carrying a friction assembly at its other end, a lever member pivoted at one point to said structure at the locus of the pivot of said hanger member and having a connection with associated brake rigging at another point, and an adjustable connection between said members at a point on said hanger intermediate the ends thereof and a point on said lever other than said first and second-mentioned points, said adjustable connection comprising a fulcrum member pivoted to one of said members and an adjusting screw in threaded engagement with the other of said members and having a rotatable connection with said fulcrum member.

6. In a railway brake arrangement, a pair of hangers pivotally supported at their upper ends from an associated support structure on a common pivot member and carrying friction means at their lower ends, an elbow lever pivoted intermediate its ends on said member and having one leg thereof extending downwardly and the other leg thereof extending laterally of said hangers, said other leg having a connection at its extremity with associated brake rigging, and an adjustable connection between said one leg and said hangers comprising an adjusting screw mounted in the lower end of said one leg and in threaded engagement therewith, and a trunnion block between said hangers pivoted thereto intermediate the ends thereof on a substantially horizontal axis and having a rotatable connection with said screw.

7. In a railway brake arrangement, a hanger pivotally supported at one point from an associated support structure, a friction assembly connected to said hanger at another point, a brake lever pivoted intermediate its ends at the point of support of said hanger and having a connection at one end with associated brake rigging, and an adjustable connection between the other end of said lever and said hanger at a point other than said first and second points, said connection comprising a screw mounted in said lever and in threaded engagement therewith, and a trunnion block pivoted to said hanger at said other point and having a rotatable connection with said screw.

8. In a railway brake arrangement, a hanger member pivotally supported at one point from an associated support structure, a friction assembly connected to said hanger member at another point, a brake lever member pivoted intermediate its ends at the point of support of said hanger member and having a connection at one end with associated brake rigging, and an adjustable connection between the other end of said lever member and said hanger member at a point other than said first and second-mentioned points, said adjustable connection comprising an adjusting bolt threaded into one of said members and a fulcrum block connected to the other of said members and having a rotatable connection with said bolt.

9. In a railway brake arrangement, a hanger pivotally suspended on a substantially horizontal axis at its upper end from an associated support structure and carrying friction means at its lower end, and an elbow brake lever pivoted to said structure at its elbow at the point of suspension of said hanger and having its upper leg operatively connected to associated actuating means and having its lower leg adjustably connected to said hanger at a point adjacent the lower end thereof, said adjustable connection including an element connected to said hanger and a rotatable adjusting element rotatably connected to said first-named element and in threaded engagement with said lower leg of said lever.

10. In a brake arrangement for a railway car truck, a hanger and a lever, wheel-engaging friction means carried by the hanger, operating means connected to the lever, an adjustable connection between the lever and hanger spaced from the first-mentioned connection and comprising a screw in threaded engagement with the lever and operatively associated with the hanger, said lever being pivoted with said hanger on a common axis intermediate said connections.

11. In a brake arrangement for a railway car truck comprising a support structure, a lever pivoted to said structure, operating means connected to said lever at a point spaced from the point of pivot of said lever, a hanger pivoted at one end to the structure at the point of pivot of said lever, and brake shoe means carried by said hanger at the other end thereof, said hanger being adjustably connected at a point between its ends to said lever by a screw operatively connected to the hanger and in threaded engagement with the lever.

CARL E. TACK.
FRED E. BACHMAN.

REFERENCES CITED

The following references are of record in the file of this patent:

UNITED STATES PATENTS

| Number | Name | Date |
|---|---|---|
| 971,764 | Lutz | Oct. 4, 1910 |
| 1,231,633 | Mills | July 3, 1917 |
| 1,241,147 | Plath | Sept. 25, 1917 |
| 2,015,881 | Alden | Oct. 1, 1935 |
| 2,167,610 | Helsten | July 25, 1939 |
| 2,386,907 | Pierce | Oct. 16, 1945 |